(12) United States Patent
Gislard et al.

(10) Patent No.: US 9,803,499 B2
(45) Date of Patent: Oct. 31, 2017

(54) METHOD TO IMPROVE THE THERMAL PROPERTIES OF A RESISTANCE ELEMENT EMBEDDED IN AN ALUMINA DEPOSIT ON A SURFACE OF A SUBSTRATE AND APPLICATION OF SAID METHOD

(71) Applicant: SNECMA, Paris (FR)

(72) Inventors: Vanessa Aurelie Gislard, Boussy Saint Antoine (FR); Melanie Alice Camille Ruelle, Palaiseau (FR)

(73) Assignee: SNECMA, Paris (FR)

( * ) Notice: Subject to any disclaimer, the term of this patent is extended or adjusted under 35 U.S.C. 154(b) by 1016 days.

(21) Appl. No.: 14/052,909

(22) Filed: Oct. 14, 2013

(65) Prior Publication Data

US 2014/0105741 A1   Apr. 17, 2014

(30) Foreign Application Priority Data

Oct. 15, 2012   (FR) ..................... 12 59822

(51) Int. Cl.
| | | |
|---|---|---|
| *B05D 3/02* | (2006.01) | |
| *F01D 21/00* | (2006.01) | |
| *C04B 35/10* | (2006.01) | |
| *F01D 5/28* | (2006.01) | |
| *B32B 18/00* | (2006.01) | |
| *C23C 18/12* | (2006.01) | |

(52) U.S. Cl.
CPC ............ *F01D 21/003* (2013.01); *B32B 18/00* (2013.01); *C04B 35/10* (2013.01); *C23C 18/127* (2013.01); *C23C 18/1208* (2013.01); *C23C 18/1283* (2013.01); *F01D 5/288* (2013.01); *C04B 2235/3217* (2013.01); *C04B 2235/447* (2013.01); *C04B 2235/616* (2013.01); *C04B 2237/343* (2013.01); *C04B 2237/704* (2013.01); *F05D 2230/90* (2013.01); *F05D 2300/173* (2013.01)

(58) Field of Classification Search
CPC .............................. F01D 21/003; B32B 18/00
USPC ........................................................ 427/376.1
See application file for complete search history.

(56) References Cited

U.S. PATENT DOCUMENTS

| | | | |
|---|---|---|---|
| 6,309,994 B1 * | 10/2001 | Marra ................. | C04B 35/6309 428/294.7 |
| 6,461,415 B1 | 10/2002 | Sambasivan et al. | |
| 6,770,325 B2 * | 8/2004 | Troczynski ............. | C04B 28/34 427/376.2 |

(Continued)

FOREIGN PATENT DOCUMENTS

WO   WO 2006/129097 A1   12/2006

OTHER PUBLICATIONS

French Preliminary Search Report dated Mar. 25, 2013 in French 12 59822, filed on Oct. 15, 2012 (with English Translation of Category of Cited Documents).

*Primary Examiner* — Tabatha Penny
(74) *Attorney, Agent, or Firm* — Oblon, McClelland, Maier & Neustadt, L.L.P.

(57) ABSTRACT

A method for improving the heat resistance of a resistive element embedded in an alumina deposit covering a surface of a substrate, in which the alumina deposit includes a surface portion and a deep portion which is sandwiched between the surface portion and the surface of the substrate and in which the resistive element is located, is provided. The method includes a densification of the surface portion of the alumina deposit.

6 Claims, 4 Drawing Sheets

(56) References Cited

U.S. PATENT DOCUMENTS

| | | |
|---|---|---|
| 2003/0138673 A1 | 7/2003 | Sambasivan et al. |
| 2004/0011245 A1 | 1/2004 | Sambasivan et al. |
| 2008/0260952 A1 | 10/2008 | Xiao et al. |
| 2009/0064893 A1 | 3/2009 | Sambasivan et al. |
| 2010/0173150 A1* | 7/2010 | Buleon ................ G01L 1/2287 428/336 |

* cited by examiner

METHOD TO IMPROVE THE THERMAL PROPERTIES OF A RESISTANCE ELEMENT EMBEDDED IN AN ALUMINA DEPOSIT ON A SURFACE OF A SUBSTRATE AND APPLICATION OF SAID METHOD

TECHNICAL FIELD

The invention relates to a method enabling the heat resistance of a resistive element to be improved when this resistive element is embedded in an alumina deposit on a surface of a substrate.

This method notably finds applications in all fields in which an evaluation of the deformation of mechanical parts, which are intended to be exposed to very high temperatures, i.e. typically over 950° C., by means of resistive elements of the strain gauge type, is required and, in particular, in the field of design of engine parts for aeronautics, such as turbine blades.

The invention therefore also relates to a turbine blade comprising a surface covered with an alumina deposit in which at least one resistive element is embedded, the thermal properties of which have been improved by said method.

Lastly, it relates to a turbine comprising such a blade, and also to a turbomachine comprising such a turbine.

STATE OF THE PRIOR ART

In the field of design of engine parts for aeronautics, and in particular turbine blades, it is habitual to use strain gauges (also called "deformation gauges") to measure the deformations which these parts may undergo when they are subjected to an extreme environment and, notably, to very high temperatures. These measurements are essential to analyse the mechanical and thermal resistance properties of these parts, and to obtain from the authorities a certification of the aeronautical device on which they are intended to be used.

Strain gauges are passive sensors, the electrical resistance of which varies according to the deformation of the parts on which they are applied.

They conventionally consist of a grid formed by a thin conductor wire, generally a few micron thick, made of a metal alloy of the nickel-chromium, nickel-copper or platinum-tungsten type, which, depending on the size of the gauge, allows elongation of as much as 5% of the length of wire.

To attach the strain gauges on to the surface of the parts of which it is desired to measure the deformations, and to protect them from the external environment, these gauges are generally embedded in an alumina deposit, which is typically produced by thermal spraying and, notably, by flame spraying.

To facilitate the adhesion of this alumina deposit on the surface of the parts this surface is prepared beforehand, for example, by undertaking in succession kiln cleaning, degreasing and sand-blasting of it.

These operations are followed by the deposition of a metal undercoat, also called a "primer undercoat", which conventionally consists of an alloy of the MCrAlY type (where M=Co, Fe or Ni), and which enables the adhesion of the alumina on the surface of the parts to be strengthened.

The alumina is then deposited on the primer undercoat. It generally consists of several superimposed layers of alumina, typically three such, which are deposited one by one, and each of which has a well-defined function. Indeed, while the first layer of alumina is intended to insulate the strain gauges electrically from the surface of the parts, the second layer of alumina is intended to lock these gauges in place on this surface, whereas the purpose of the third layer of alumina is to protect them from the environment.

It has been observed that, if a strain gauge is used to measure the deformations which may be undergone by a part at temperatures of over 950° C., the electrical and mechanical characteristics of this gauge are modified, causing a loss of the electrical signals which it is supposed to emit and, consequently, reduced reliability of the deformation measurements made using this gauge.

Reduced reliability of the measurements made on parts and, notably, on engine parts of an aircraft, may prejudice the certification campaign of this device and therefore lead to substantial delays in its development programme, with the risk of a substantial financial loss.

The Inventors therefore set themselves the goal of resolving this problem.

The Inventors also set themselves the goal that the solution to this problem should apply to any resistive element which is embedded in an alumina deposit, and the electrical and mechanical characteristics of which are likely to be modified in the presence of very high temperatures.

The Inventors also set themselves the goal that this solution should be simple to implement and not require complex and costly equipment.

DESCRIPTION OF THE INVENTION

This aim and others are met by the invention which proposes, firstly, a method for improving the heat resistance of a resistive element embedded in an alumina deposit covering a surface of a substrate, where the alumina deposit comprises a surface portion and a deep portion which is sandwiched between the surface portion and the surface of the substrate and in which the resistive element is located, which method is characterised in that it comprises a densification of the surface portion of the alumina deposit.

Indeed, in the course of their work, the Inventors observed that the modifications of the electrical and mechanical characteristics of a resistive element, of the strain gauge type, which are observed when this resistive element is embedded in an alumina deposit on a surface which is subjected to temperatures of over 950° C. results from an oxidation of the resistive element, and that this oxidation is due to the existence of interconnected pores and microcracks (which therefore emerge on the exterior), within the alumina deposit.

By densifying the surface alumina deposit, it is therefore possible to fill the porosity and the microcracks located in the surface portion of this deposit and, hence, to create a barrier able to protect the resistive element located in the underlying portion of the alumina deposit (called in this case the "deep portion") against any oxidation, without however modifying the characteristics of the alumina deposit in this underlying portion.

The porosity and the microcracks present in the underlying portion of the alumina deposit can therefore be preserved, such that the ductility of the alumina (which enables the resistive element to fulfil its function as a measuring instrument when it is a strain gauge) in this portion may be maintained.

In accordance with the invention, the densification of the surface portion of the alumina deposit is preferably achieved by:

a) impregnating this surface portion by a solution comprising alumina particles and an aluminium phosphate;

b) drying the surface portion so impregnated; and c) applying a heat treatment to the surface portion so dried.

The solution comprising the alumina particles and the aluminium phosphate, which is used in step a), is advantageously an aqueous solution comprising 20 to 50% by mass of aluminium phosphate, where the latter is, preferably, aluminium tris(dihydrogenophosphate) [$Al(H_2PO_4)_3$].

For reasons of practicality and also of speed of use of the method according to the invention, such a solution may be obtained by dilution with water and, preferably, distilled water, of the product which is manufactured by Aremco Products and distributed by Polytec under the commercial name Ceramacoat™ 503-VFG-C, in which case this dilution is preferably achieved by adding 15±1% by mass of water to this product (i.e. 0.14 to 0.16 gram of water for each gram of product).

As previously mentioned, step a) of the method consists in impregnating the surface portion of the alumina deposit with the solution comprising the alumina particles and the aluminium phosphate.

This impregnation is advantageously accomplished by applying this solution on to the surface of the alumina deposit by means of a paint brush.

However, it is also possible to use a sponge brush or a pneumatic spray device.

Step b) of the method consists, for its part, in drying the surface portion of the alumina deposit which has been impregnated with the solution comprising the alumina particles and the aluminium phosphate.

This drying is advantageously achieved by leaving the substrate and the alumina deposit covering it at ambient temperature, for example for a period of between 1 and 4 hours.

Step c) consists in subjecting the surface portion of the alumina deposit dried in this manner to a heat treatment.

In accordance with the invention, this heat treatment is preferably applied in stages and comprises in succession:

heating the surface portion of the alumina deposit to a temperature $T_1$ of between 90 and 100° C., for example 95° C., for a period of 1 to 3 hours, and ideally of 2 hours;

heating the surface portion of the alumina deposit to a temperature $T_2$ of between 240 and 280° C., for example of 260° C., for a period of 1 to 3 hours, and ideally of 2 hours; and heating the surface portion of the alumina deposit to a temperature $T_3$ of between 350 and 390° C., for example of 370° C., for a period of 1 to 3 hours, and ideally of 2 hours.

In accordance with the invention, the thickness of the surface portion of the alumina deposit is preferably between 20 and 30%, and ideally 25%, of the total thickness of this deposit.

Furthermore, the resistive element is preferably a strain gauge, whereas the substrate is, for its part, preferably a turbine blade, in which case the alumina deposit advantageously consists of a first, a second and a third layer of alumina, which are superimposed, and which are deposited in this order on the turbine blade, preferably by thermal spraying and, more preferably, by flame spraying, and the surface portion of the alumina deposit is a portion of the thickness of the third layer of alumina, which portion is typically 100 to 150 µm thick. In other words, the surface portion of the alumina deposit which is impregnated by the solution comprising the alumina particles and the aluminium phosphate is typically 100 to 150 µm thick.

Another object of the invention is a turbine blade which comprises a surface covered with an alumina deposit in which at least one resistive element is embedded, the alumina deposit comprising a surface portion and a deep portion which is sandwiched between the surface portion and the surface of the blade and in which the resistive element is located, and which is characterised in that the surface portion has been densified by a method as described above.

Another object of the invention is a turbine comprising such a blade, together with a turbomachine, for example a turbojet, comprising such a turbine.

Other characteristics and advantages of the invention will emerge from the additional description which follows, which relates to an example of embodiment of the method according to the invention, and which refers to the appended figures.

It is self-evident that this example is given only to illustrate the object of the invention, and in no way constitutes a limitation of it.

DETAILED DESCRIPTION OF PARTICULAR EMBODIMENTS

Test pieces are produced consisting of a layer of alumina on a substrate made of an Ni53/Fe19/Cr19/Nb/Mo/Ti alloy (Inconel™ 718) by flame spraying of alumina rods (Rokide™). The layer of alumina is 500 µm thick.

A paint brush is then used to apply, on to the surface of the layer of alumina of these test pieces, a layer 50 to 200 µm thick of an aqueous solution, called below an "impregnation solution", which has been previously obtained by dilution of the product Ceramacoat™ 503-VFG-C (available from the company Polytec) with distilled water, at a proportion of 0.15 g of distilled water for 1 g of product.

After drying at ambient temperature for 4 hours, the test pieces were subjected to a heat treatment comprising a first treatment lasting 2 hours at 95° C., followed by a second treatment lasting 2 hours at 260° C., and finally a third treatment lasting 2 hours at 370° C.

They were then subjected to analyses by scanning electron microscopy (SEM) and to energy-dispersive analyses (EDS).

Figure 1:
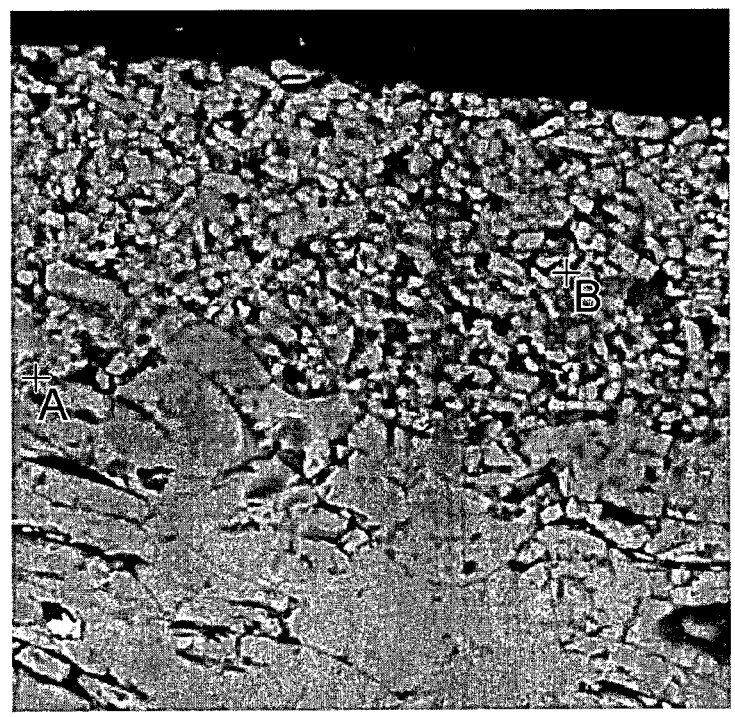
FIG. 1 is a scanning electron microscopy image (1,000 times enlargement) which partially shows a test piece consisting of a substrate made of a metal alloy covered with a layer of alumina, the surface portion of which has been densified by the method of the invention.
Figure 2A:
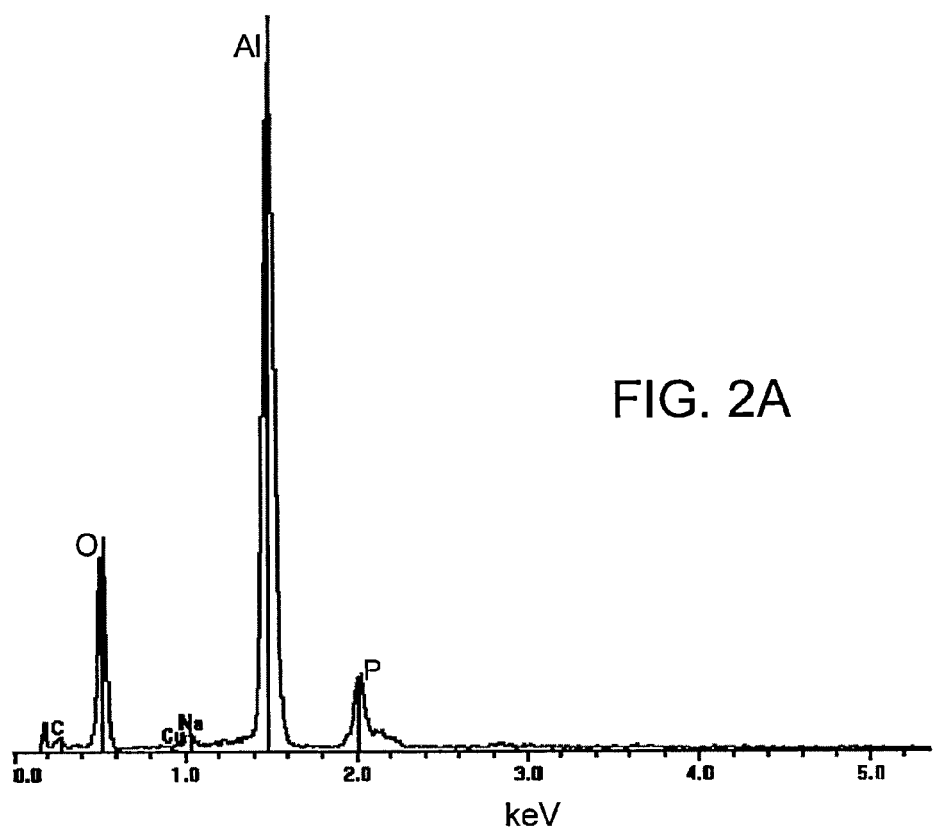
FIGS. 2A and 2B represent the spectra obtained by energy-dispersive analysis at the points noted A and B in FIG. 1.
Figure 2B:
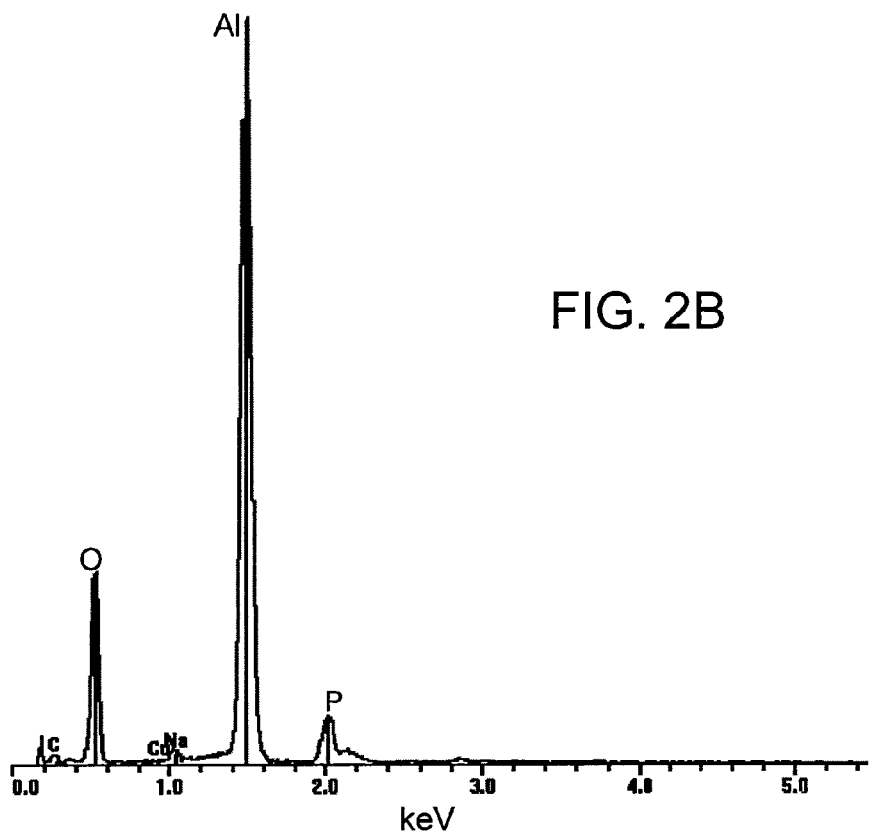

The results of these analyses are illustrated in FIGS. 1, 2A and 2B for a first test piece, and in FIGS. 3, 4A, 4B and 4C for a second test piece.

FIG. 1, which is an image taken using SEM (1,000 times enlargement) on the first test piece, shows a difference of appearance between the surface portion of the layer of alumina (at the top of the image), which is the portion which was impregnated by the impregnation solution and densified, and the underlying portion of this layer which was not.

FIG. 2A, which represents the spectrum obtained by EDS at the point noted A in FIG. 1, shows the presence of phosphorus (through the presence of the phosphorus peak) at this point, and enables it to be concluded that the layer of alumina was impregnated by the impregnation solution at least as far as said point A.

FIG. 2B, which represents the spectrum obtained by EDS at the point noted B in FIG. 1, shows the presence of the different components of the impregnation solution (through the presence of the alumina peak and of the phosphorus peak) at this point.

Figure 3:
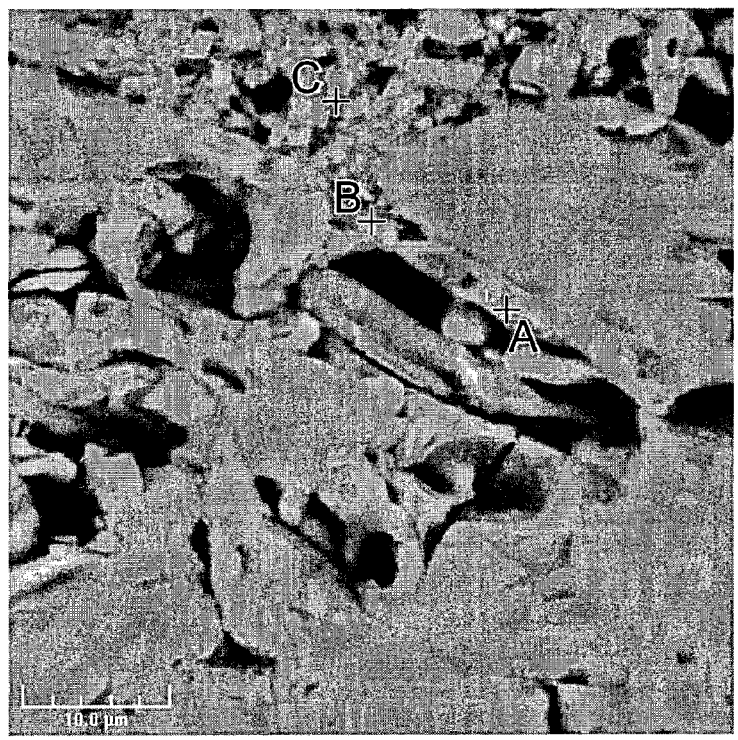
FIG. 3 is a scanning electron microscopy image (2,000 times enlargement) which partially shows another test piece consisting of a substrate made of a metal alloy covered with a layer of alumina, the surface portion of which has also been densified by the method of the invention.

FIG. 3, which is an image taken using SEM (2,000 times enlargement) on the second test piece, also shows a difference of appearance between the surface portion of the layer of alumina (at the top of the image), which is the portion which was impregnated by the impregnation solution and densified, and the underlying portion of this layer which was not.

Figure 4A:
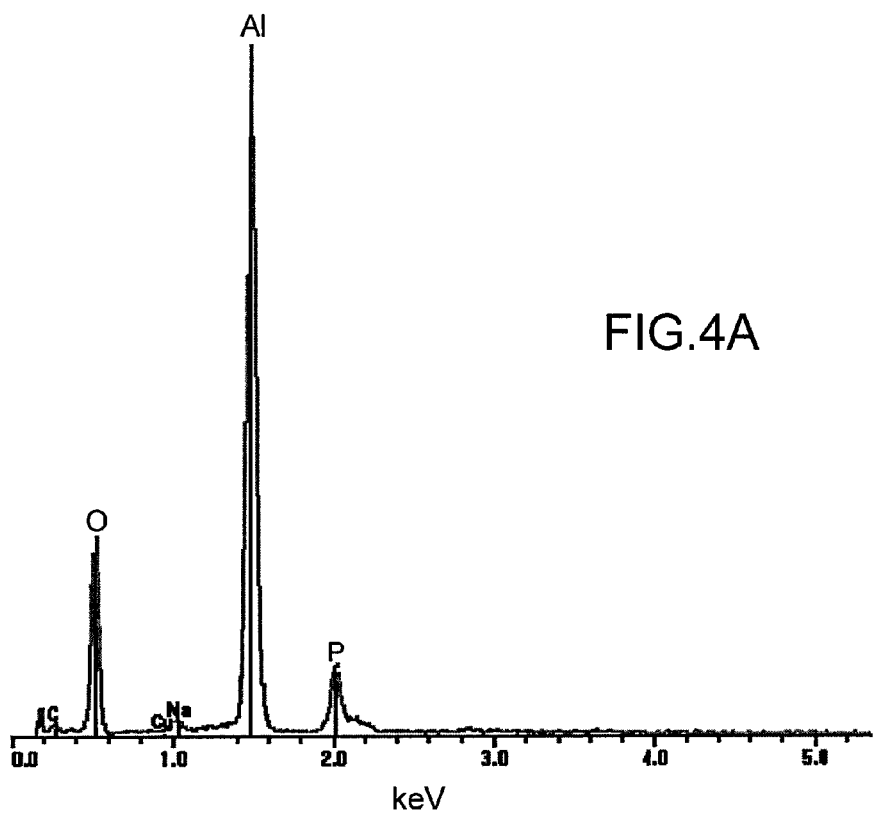
FIGS. 4A, 4B and 4C represent the spectra obtained by energy-dispersive analysis at the points noted A, B and C in FIG. 3.

FIG. 4A, which represents the spectrum obtained by EDS at the point noted A in FIG. 3, shows a phosphorus peak and an alumina peak, marking the presence of phosphorus and, therefore, the impregnation of the layer of alumina by the impregnation solution at this point.

Figure 4B:
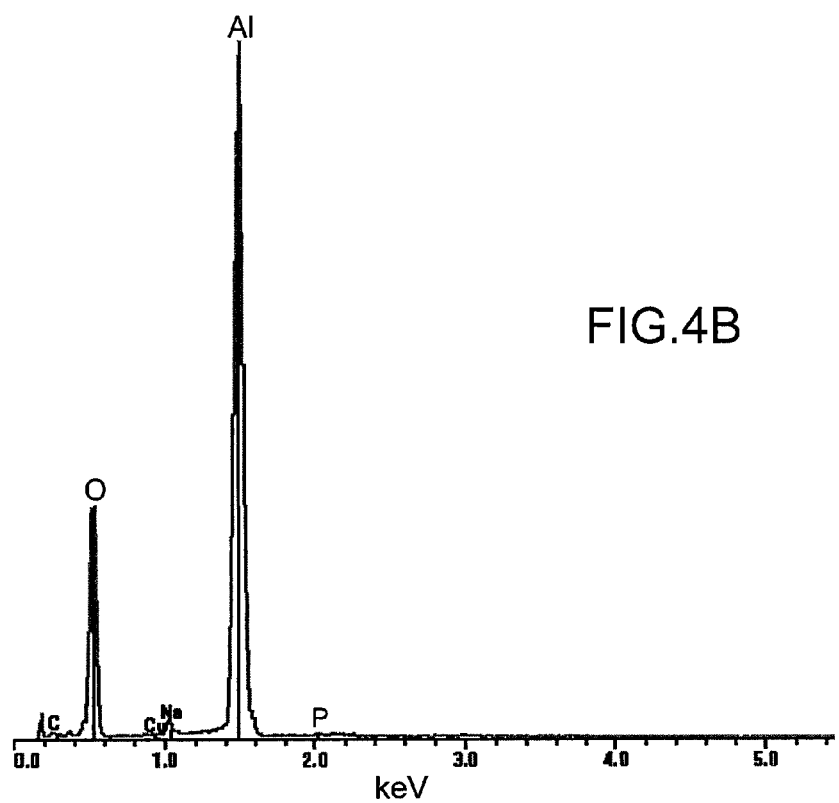
Figure 4C:
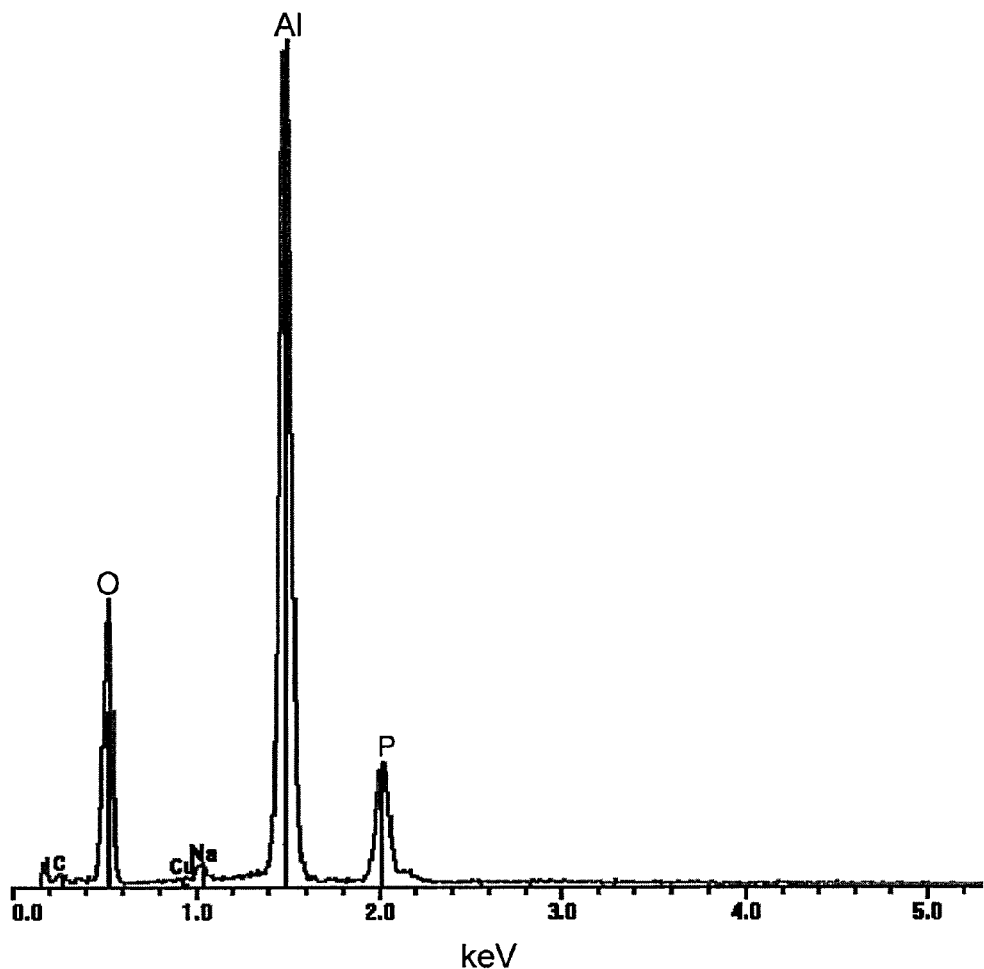

FIG. 4B, which represents the spectrum obtained by EDS at the point marked B in FIG. 3, shows an alumina peak corresponding to the alumina deposit, whereas FIG. 4C, which represents the spectrum obtained by EDS at the point noted C in FIG. 3, shows the presence of the different components of the impregnation solution (through the presence of the alumina peak and of the phosphorus peak) at this point.

The invention claimed is:

1. A method for improving the heat resistance of a resistive element embedded in an alumina deposit covering a surface of a substrate, the alumina deposit comprising a surface portion and a deep portion which is sandwiched between the surface portion and the surface of the substrate and in which the resistive element is located, the method comprising:
   densificating the surface portion of the alumina deposit, the densificating including
   a) impregnating said surface portion by a solution comprising alumina particles and an aluminium phosphate;
   b) drying the surface portion so impregnated; and
   c) applying a heat treatment to the surface portion so dried.

2. A method according to claim 1, wherein the solution used in a) is an aqueous solution which comprises 20% to 45% by mass of aluminium phosphate.

3. A method according to claim 1, wherein b) is achieved at ambient temperature for a period of 1 hour to 4 hours.

4. A method according to claim 1, wherein c) comprises in succession:
   heating the surface portion of the alumina deposit to a temperature $T_1$ of between 90° C. and 100° C. for a period of 1 hour to 3 hours;
   heating the surface portion of the alumina deposit to a temperature $T_2$ of between 240° C. and 280° C. for a period of 1 hour to 3 hours; and
   heating the surface portion of the alumina deposit to a temperature $T_3$ of between 350° C. and 390° C. for a period of 1 hour to 3 hours.

5. A method according to claim 1, wherein a thickness of the surface portion of the alumina deposit is between 20% and 30% of a total thickness of the alumina deposit.

6. A method according to claim 1, wherein the resistance element is a strain gauge, and the substrate is a turbine blade.

* * * * *